Feb. 3, 1931.  R. C. KNOLL  1,790,868
SAUSAGE STUFFING AND LINKING MACHINE
Filed March 7, 1929  4 Sheets-Sheet 1
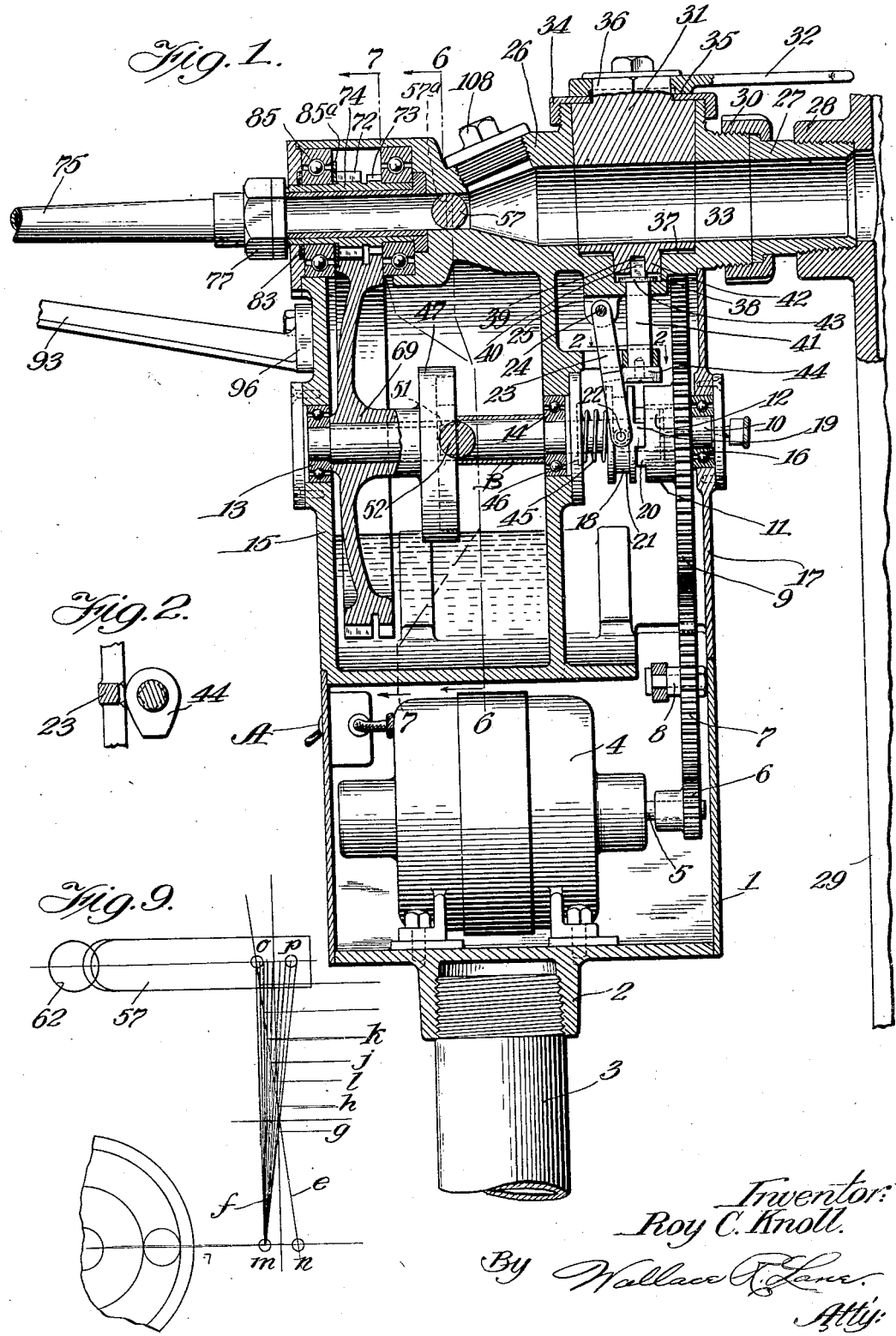
Inventor:
Roy C. Knoll.
By Wallace R. Lane
Atty.

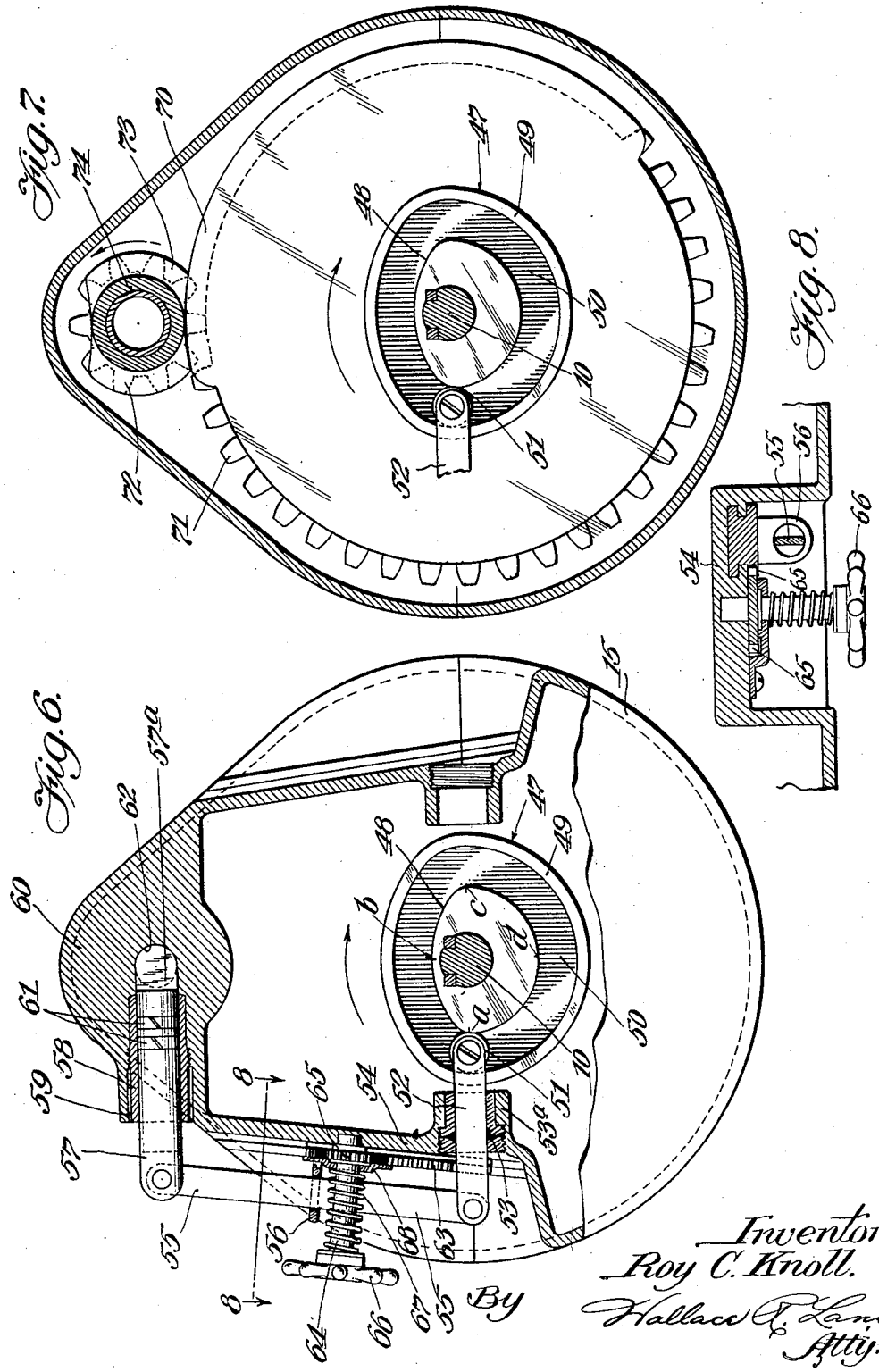

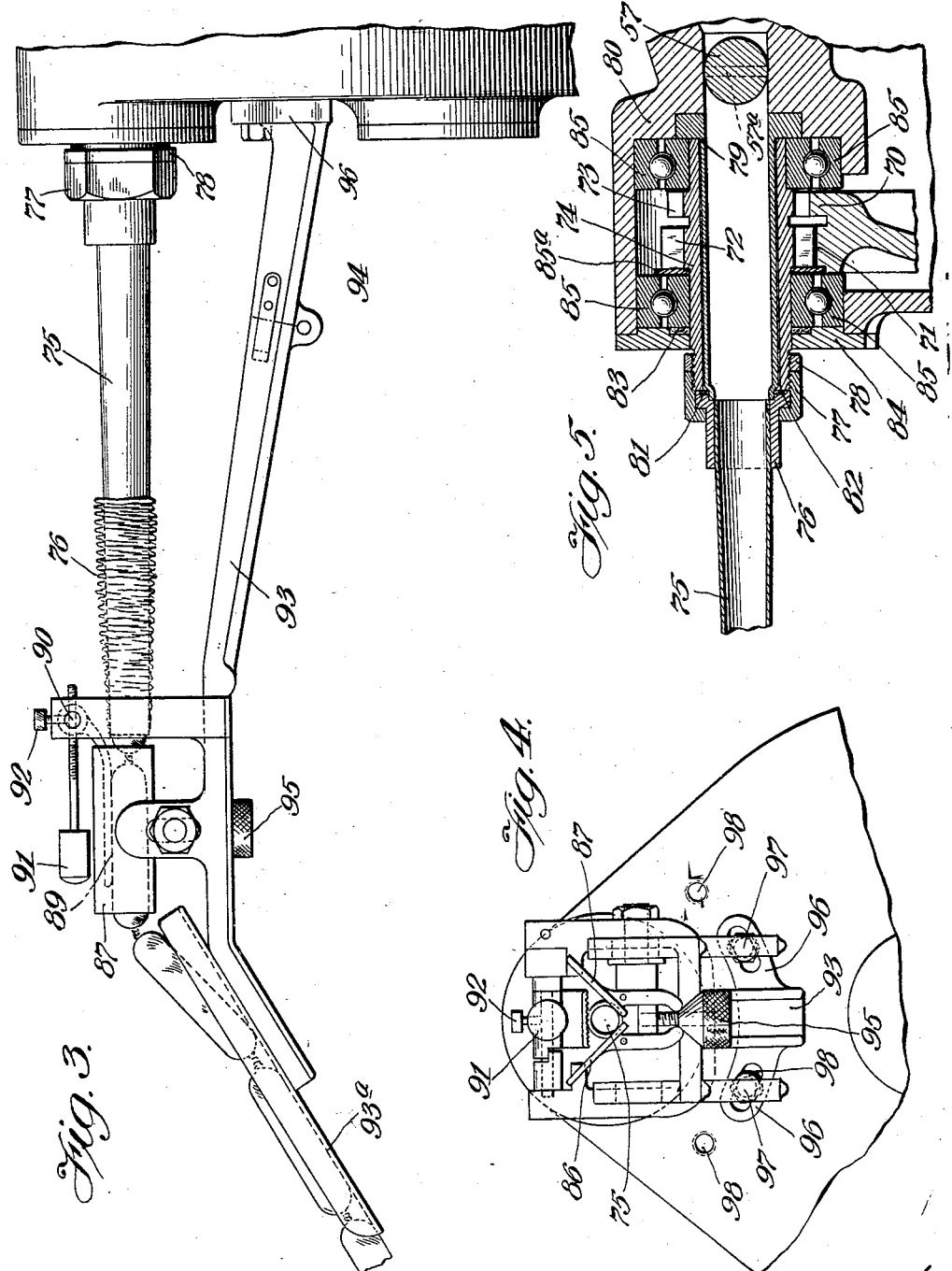

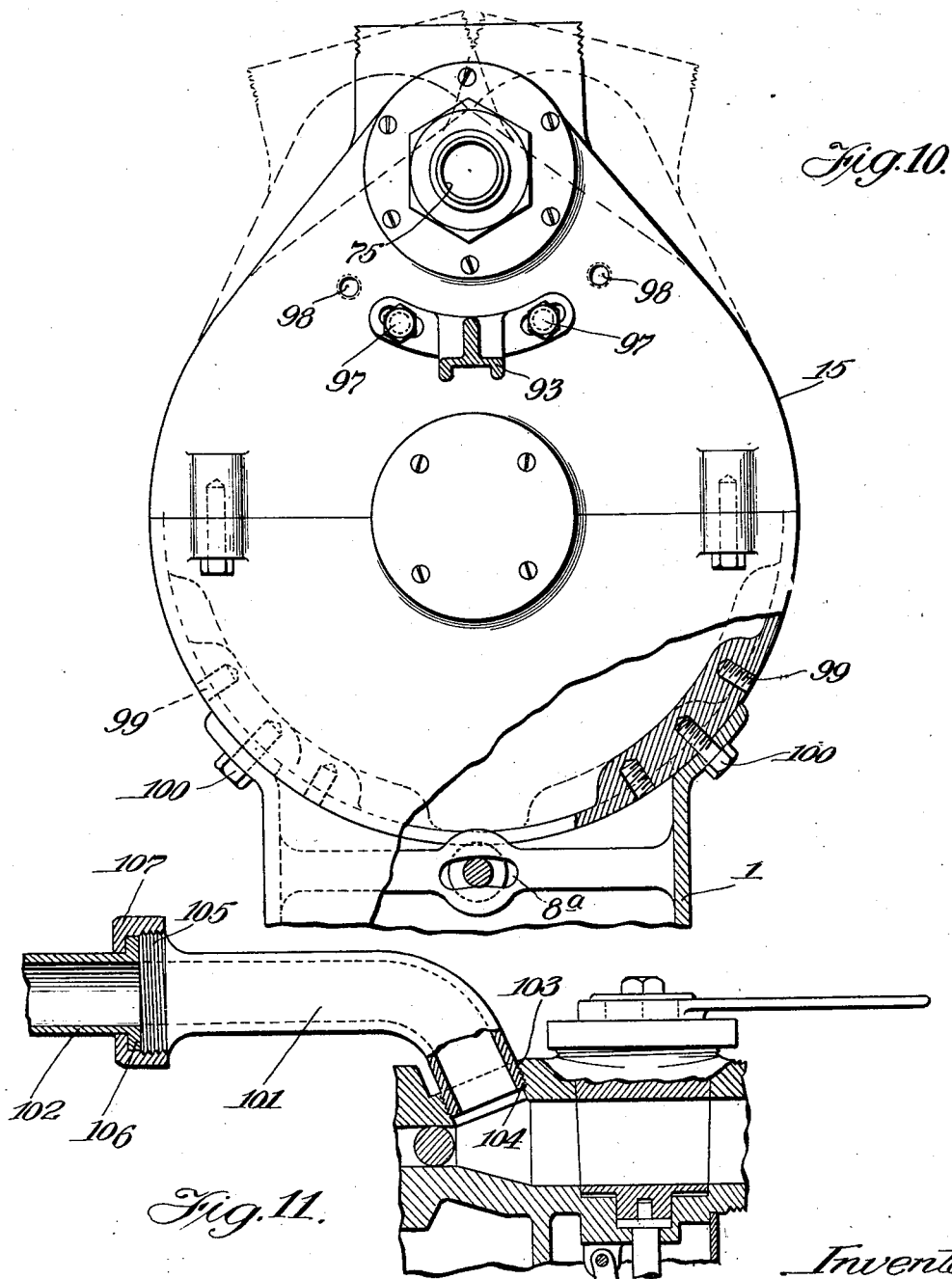

Patented Feb. 3, 1931

1,790,868

UNITED STATES PATENT OFFICE

ROY C. KNOLL, OF CHICAGO, ILLINOIS, ASSIGNOR TO MIDDLE STATES MFG. CO., OF CHICAGO, ILLINOIS, A CORPORATION OF DELAWARE

SAUSAGE STUFFING AND LINKING MACHINE

Application filed March 7, 1929. Serial No. 345,033.

My invention relates to sausage stuffing and linking machines, and more in particular to a novel construction of machine which stuffs and links the casings by twisting them, the stuffing and linking operations being carried out successively and automatically. The usual practice of manufacturers of sausage consists in the mounting of a casing on a tube which is connected to a large receiver or stuffer, in which the sausage meat is placed. The meat from this stuffer is forced out of the end of a tube into a casing for its full length. Operators then take this length and lay it across a measuring device or gauge and twist the sausage into the lengths required for the trade. This practice requires a large amount of labor, is very slow and tedious, and is objectionable from a sanitary viewpoint, there being a great amount of handling of such sausage by the operator. By means of the present construction, the sausage meat is forced from the stuffer under pressure, into a cylindrical container of my machine, and directly into a casing. Novel means and methods are provided for passing the sausage meat into the casing, and for twisting the casing at proper lengths. These steps are carried out automatically and successively, without any handling of the sausage by the operator.

Among the objects of my invention are to provide a novel construction of sausage stuffing and linking machine, which is very compact and necessitates the use of the least amount of manual labor; further to provide a novel construction of drive means for operating the stuffing and linking machine; further to provide a novel construction of valve mechanism adapted to not only allow for the flowing of the sausage meat, but also throw into or out of engagement a clutch mechanism for linking the sausages, the valve starting the operation of the machine before the sausage meat begins to flow, and stopping the flow of meat before the clutch is thrown out of engagement; further to provide a novel construction of cam mechanism for closing and opening the passage for the sausage, the closing taking place during the twisting operation; further to provide a novel means and method of twisting the sausages and making them of substantially uniform length; further to provide a novel gear and cam mechanism; further to provide a novel means and construction of regulating valve for varying the size of opening through which the exuded meat passes, and for varying the size of sausages produced; further to provide a novel construction of housing adapted to be adjusted and positioned so as to allow for the attaching of a plurality of my sausage stuffing and linking machines to a single stuffer; further to provide a leak-proof and sanitary construction; further to provide a novel construction of maximum simplicity, efficiency, economy, and ease of operation; and such further objects, advantages, and capabilities as will later more fully appear.

My invention further resides in the combination, construction and arrangements of parts illustrated in the accompanying drawings, and while I have shown therein a preferred embodiment, I desire it to be understood that the same is susceptible of modification and change without departing from the spirit of my invention.

Referring to the drawings:

Fig. 1 is a fragmentary view in vertical cross section taken through my novel construction of sausage stuffing and linking machine.

Fig. 2 is a fragmentary view in horizontal cross section taken on the line 2—2 of Fig. 1.

Fig. 3 is a fragmentary view in side elevation of the front of the machine.

Fig. 4 is a fragmentary view in front elevation of the construction disclosed in Fig. 3, but with the slide removed.

Fig. 5 is a fragmentary view in vertical cross section of a portion of the machine disclosed in Fig. 1, but on an enlarged scale.

Fig. 6 is a view in vertical cross section taken on the line 6—6 of Fig. 1.

Fig. 7 is a view in vertical cross section taken on the line 7—7 of Fig. 1.

Fig. 8 is a view in horizontal cross section taken on the line 8—8 of Fig. 6.

Fig. 9 is a diagrammatic showing of the means and method of changing the fulcrum point of the regulating valve disclosed in Fig. 6, by means of which the valve may be caused to open to any desired degree for the purpose of making sausages of varying size.

Fig. 10 is a view in front elevation with a portion thereof broken away, disclosing the means of shifting and adjusting my machine so as to connect a plurality of such machines to a single stuffer.

Fig. 11 is a fragmentary view in vertical cross section, with a portion in side elevation, disclosing a connection which may be used when it is desired to stuff relatively large and coarse sausages and meats.

My novel construction of sausage stuffing and linking machine comprises a housing 1 provided with a boss 2 mounted upon a pedestal 3 of a base (not shown). Mounted within the housing is a fractional horse power motor 4, operated by a switch A, and provided with a shaft 5 having mounted thereon a pinion 6, meshing with and driving an idler gear 7, mounted upon a stub shaft 8, which is shiftable in an arcuate slotted bar 8ª. This idler gear 7 meshes with and drives a comparatively large gear 9, mounted upon a shaft 10. The gear 9 acts also as a fly wheel, so that the motor need not be stopped but may operate at all times, the gear 9 carrying enough momentum to overcome the initial large torque when the machine is being started. It is to be understood that this motor is operating at all times that it is desired to use the machine, and the gears rotating at all times, regardless of whether or not the machine is stuffing and linking sausage, as when a new casing is being slipped over the tube, etc. Of course, it is to be understood that the motor may be shut down at any time that it is desired, but in view of the small consumption of current of a motor of the size required for operating my machine, which is substantially one-eighth to one-sixth horse power, it is unnecessary to continually start and stop the motor. Furthermore, in view of the large torque necessary in the starting of the mechanism, it has always been necessary to use a motor of considerably greater horse power to take care of the initial load. Thus, there would be a great waste in the initial cost and current consumption. In my construction, the fly wheel is adapted to start the machine when the clutch is thrown in, without any danger of burning out the motor. The mechanism of the machine is set in motion whenever the operator so desires.

The fly wheel gear 9 is provided with a hub 11 and bearing 12, this gear and hub being adapted to rotate upon and relative to the shaft 10. The shaft 10 is mounted within bearings 13 and 14, within a housing 15, and in bearings 16 mounted in a base plate 17 at the rear of the machine. In order to properly lubricate this shaft, I provide longitudinal and radial openings for the reception of a lubricant. Mounted on and rotatable with the shaft, is clutch member 18 provided with lugs 19 adapted to engage lugs 20 on the hub 12 of the fly wheel gear. The clutch member 18 is provided with an annular channel 21, in which are mounted pins 22 on a bifurcated lever arm 23. This lever arm is pivoted at 24 to a lug 25 provided on the under surface of a casting 26 in the upper part of the housing 15. The casting 26 is connected through a nipple 27 to the boss 28 of a stuffer 29, a portion thereof only being shown. The stuffer is generally a large cylindrical container containing the sausage meat, the meat being held or forced under pressure into the sausage stuffing and linking machine. A nut 30 connects the nipple to the member 26 and prevents any leakage of the meat. The member 26 is further provided with a valve 31 adapted to be operated by means of a handle 32, for opening or closing of a passage 33 for the meat from the stuffer to the linking mechanism. A lock nut 34 allows for the turning of the handle 32 and the valve 31 but prevents any leakage of the meat products therearound. The handle can be turned through an angle of 90°. As shown, the nut 34 fits relatively tightly to the upper shoulder 35 of the valve member, the central portion of the valve having an upstanding polygonal head 36, for engaging the polygonal opening in the handle or arm 32. Thus the valve and arm rotate relatively to the lock nut 34.

The bottom portion of the valve 31 is seated in a depression 37, this lower portion of the valve being further provided with a lug 38 having a polygonal opening 39, adapted to receive a polygonal projection 40 on a stem 41. The slot 42 in which the lug 38 fits, passes transversely through the entire machine so as to allow for the ready removal of the stem, the flange 43 preventing leakage of either the meat products or any lubricant. The stem 41 is provided with a cam 44 adapted to impinge against the bifurcated arm 23, and force the clutch 18 out of engagement with the hub 11 of the fly wheel gear 9. The valve, cam, and clutch mechanism is so constructed that the machine gets into motion before the meat starts to flow and also stops flow of meat before the clutch is thrown out of engagement. Thus, when the valve is closed and shortly before it is closed, the clutch is out of engagement and gear 9 rotates idly. Also as the valve is being opened, and before the meat begins to flow, the valve turns the cam out of impingement and allows the clutch to engage the gear and be operated thereby. A spring 45 is placed against a plate 46 and against the clutch member 18, and normally forces this clutching member into clutching engagement with the fly wheel gear.

Mounted on and keyed to the shaft 10 within the housing 15, is a cam 47 provided with cam surfaces 48 and 49 intermediate of which is a groove 50 adapted to receive a roller 51 mounted on and rotatable on an arm 52. A sleeve B provides a spacing means between bearing 14 and cam 47. The arm 52 is slidable in a bushing 53 in a boss 53ª mounted in a side wall 54 of the housing wall. A lever arm 55 fulcrumed in a projection 56, is connected at its lower end to the arm 52, and at its upper end to a valve member 57 provided with a flattened end 57ª, the valve being slidable in a bushing 58, mounted in the boss 59 and wall of the upper portion 60 of the housing. Packing means are provided on each of the members 52 and 57.

In order to make the construction leak proof, I provide a plurality of expanding piston rings 61 on the periphery of the valve, or in transverse peripheral grooves cut in the wall of the same. This prevents any flow of the meat from the cylindrical opening 62 in the upper wall of the sausage stuffer and twisting machine.

In Fig. 9, I disclose diagrammatically the method and means for changing the length of stroke of the valve 57. The line $e$ represents the bracket with the projection 56 which forms the fulcrum point, and the letter $f$ represents the arm 55 in its various positions. As the member 56 is raised to its various positions designated $g$, $h$, $i$, $j$, $k$ etc., the length of stroke of the arm 52 is always the same, namely from $m$—$n$, while the stroke of the valve 57 varies between the points $o$—$p$.

In the positions shown in Figs. 6 and 7 of the drawings, the valve and cam mechanism is shown in the position when the valve is closed, and no meat is flowing through the opening 62. This is represented in Fig. 6 by the letter $a$. When the portion of the cam adjacent $b$ is in contacting engagement with the roller 51, the valve 57 is in its most widely open position, while when the roller 51 is adjacent the portion $c$, the valve is closed but is about to open, it being understood that the cam rotates in a clock-wise direction. During the travel of the cam from the points marked $c$, $d$, $a$, the valve 57 is closed and the machine is twisting the sausage. Whenever it is desired to change the size of the sausage; i. e. whenever it is desired to make the sausages smaller than is possible when the valve is wide open, said sausages may be produced by changing the fulcrum point on the lever arm 55.

My novel construction for changing this fulcrum point comprises a rack 63 connected to or made integral with the projection 56. Thus by raising the rack 63, I raise the projection or bearing 56, and thus shorten the stroke of the valve 57, which in turn does not open the valve to the full extent possible, and thus allows a limited amount of meat to flow through the opening 62. In order to raise the rack, I provide a shaft 64 having its one end mounted in the housing wall 54. A pinion 65 is mounted on the shaft and rotatable therewith. This pinion engages the teeth in the rack 63, and raises the same. A hand wheel 66 is mounted on the other end of the shaft 64, and rotates the same. In order to provide proper tension and prevent the disengagement of the gear and rack by means other than manual turning of the handle 66, I provide a spring 67, bearing against a plate 68.

Mounted on the hub 69 of the cam member 47, I provide a cam 70, and intermittent gear 71. As shown, the gear is provided with twenty-four teeth, which teeth are adapted to intermesh with a pinion 72, provided with ten teeth. The ratio of teeth as shown, is to rotate the pinion 72 substantially two and one-half times, although either the gear or pinion may be provided with a less number or greater number of teeth, depending upon the number of twists that are desired in the link sausage. A cam 73 is also provided on the hub 74 of the pinion, this cam contacting with the cam surface 70. When the gears are in mesh, the gear 72, cam 73 and hub 74 rotate, causing the tube 75 and the casing 76 thereon to rotate, thus twisting the sausage at the end of this tube. The tube 75 is connected to the hub 74 by means of a nipple 76, nut 77 and lock nut 78, the nut and lock nut being threaded upon the outer end of the hub.

In order to provide a leak-proof construction, a sleeve 79 is pressed into the casting 80, and a gasket 81 is provided in an annular groove in a shoulder 82 of the nipple, this gasket overlapping a portion of the sleeve 79 and the hub 74. A felt washer or gasket 83 is provided in a plate 84 on the outside of the casting 80, this felt washer or gasket preventing leakage from the bearings 85 to the exterior of the machine or to the interior of the meat tube and chamber. An annular plate 85ª is provided adjacent the bearings.

The casing 76 is generally forced onto and off of the tube 75, by hand although it is to be understood that this operation may be automatic. Also, although I show the linking as being done by the machine, if desired, this may be done manually. As the sausige meat flows through the tube 75 and through the end thereof, it passes into a length of the casing 76. This operation normally takes place when the cam surfaces 70 and 73 are in engagement. The sausage passing into the casing, passes over a pair of angularly positioned plates 86 and 87. The sausages are positioned on these plates during the linking operation as shown more clearly in Fig. 3 of the drawings. In order to properly position and keep in alignment the sausages, I provide a plate 89 pivoted onto a shaft 90. A weight 91 is also pivoted on the shaft 90 and holds the plate 89 in contacting engagement with the sausages. The position of the weighted member 91 may be changed to suit the tension desired upon the sausages passing between the plates 86 and 87. A thumb screw 92 allows for such adjustability. Although I have disclosed a weighted member, it is to be understood that any tension means may be used as desired.

A bracket member 93 hinged at 94 so that the same may be dropped downwardly, provides the support for the sausages, plates and tension means as the sausages pass from the tube 75. A chute 93ª may be connected to the bracket by any suitable means. The plates 86 and 87 are made adjustable and may be raised or lowered through the medium of a thumb screw 95, while the entire bracket member is made adjustable by means of the ears 96 and bolts 97 adapted to be positioned in threaded openings 98 in the front wall of the housing 15. The entire housing and enclosed mechanism may be rotated through a substantial angle so that a single machine or a plurality of my machines may be connected to a single stuffer. In order to allow for such adjustments, I provide the housing 15 with a plurality of threaded openings 99 which may be connected by means of bolts 100 to the housing 1 and pedestal or base.

Whenever it is desired to stuff sausages of a size considerably greater than may be made by passing the meat through the tube 75, I provide a threaded elbow 101 adapted to be attached to a tube 102 upon which the casing is placed. In order to make the construction leak proof, the elbow 101 is threaded at 103 into a threaded opening 104 in the casting 26, while the other end is enlarged and threaded at 105, the enlarged portion impinging against shoulder 106 on the tube, the portions 105 and 106 being forced into tight engagement by means of a nut 107. A plug 108 is adapted to close the threaded opening 104 whenever this larger tube is not in use. Although I have shown the elbow and enlarged tube as being tapped into the top of the casting, it is to be understood that I may provide the tube 75 and the longitudinal opening leading thereto, of a substantially greater diameter, so as to take care of the larger sausages, while I may provide tubes 75 of varying sizes for use in the making of sausages of various sizes.

From the above description, it will be seen that I have provided a novel mechanism which is very efficient in operation and does away with the frequent handling of the meat. My construction is extremely light, and can be easily adjusted by the operator. All exposed parts, or where the meat products may come into contact, is made of stainless steel or an aluminum alloy which is rust-proof. There is no possibility of the meat being tainted as it passes through the machine, and all the working parts are easily accessible for assembly, cleaning and repair. The housing 15 is partially filled with a lubricant to the point where the cam 47 and intermittent gear construction dips therein, this providing a splash system of lubrication. There is no possibility of the lubricant working its way to a point where it may contact with the sausage meat.

Having thus disclosed the invention, I claim:

1. In a sausage stuffing and linking machine, a prime mover therefor adapted to be constantly rotated, a fly wheel gear rotated by said prime mover, a shaft, said gear being rotatable on said shaft, a clutch on said shaft and rotatable therewith, means operated by said shaft for stuffing and twisting sausages, a passage for the sausage meat, and means in said passage for throwing said clutch into or out of engagement with said gear.

2. In a sausage stuffing and linking machine, a prime mover therefor adapted to be constantly rotated, a fly wheel gear rotated by said prime mover, a shaft, said gear being rotatable on said shaft, a clutch on said shaft and rotatable therewith, a valve operated by said shaft for stuffing and twisting sausages, a passage for the sausage meat, and means in said passage for throwing said clutch into or out of engagement with said gear.

3. In a sausage stuffing and linking machine, a prime mover therefor adapted to be constantly rotated, a fly wheel gear rotated by said prime mover, a shaft, said gear being rotatable on said shaft, a clutch on said shaft and rotatable therewith, a valve operated by said shaft for stuffing and twisting sausages, a passage for the sausage meat, and means in said passage for throwing said clutch into or out of engagement with said gear, said means throwing said clutch into operative engagement with said gear when the passage is open, and out of operative engagement when said passage is closed.

4. In a sausage stuffing and linking machine, a prime mover therefor adapted to be constantly rotated, a fly wheel gear rotated by said prime mover, a shaft, said gear being rotatable on said shaft, a clutch on said shaft and rotatable therewith, a valve operated by said shaft for stuffing and twisting sausages, a passage for the sausage meat, and means in said passage for throwing said clutch into or out of engagement with said gear, said valve throwing said clutch into operative engagement with said gear and causing the shaft to be rotated thereby when said valve is opened, and throwing said clutch out of operative engagement with said gear when the valve is closed.

5. In a sausage stuffing and linking machine adapted to be connected to a stuffer containing sausage meat, operating means for stuffing and twisting a casing, means controlling the flow of said meat from said stuffer, said control means being operatively connected to said operating means, for starting said operating means prior to the flow of the sausage meat from said stuffer.

6. In a sausage stuffing and linking machine adapted to be connected to a stuffer containing sausage meat, mechanism for stuffing and twisting a casing, and valve mechanism for starting said stuffing and twisting mechanism prior to the flow of the sausage meat from said stuffer, and for stopping the flow of meat prior to the stopping of the stuffing and twisting mechanism.

7. In a sausage stuffing and linking machine, a motor adapted to be constantly rotated, a fly wheel gear rotated by said motor and loosely mounted upon a shaft, a toothed hub on said gear, a clutch mounted on said shaft and adapted to engage the toothed hub of said gear and be rotated thereby, means operated by said shaft for stuffing and twisting sausages, a passage for the sausage meat, a valve in said passage, a stem operated by said valve and provided at its lower end with a cam adapted to contact with said clutch, said valve when turned to closing position turning the stem and cam to impinge against said clutch and throw it out of operating engagement with said gear, and when turned to open position to cause the cam to release said clutch, and tension means for forcing said clutch into clutching engagement with said gear upon the release of said cam.

8. In a sausage stuffing and linking mechanism, a discharge for said mechanism comprising a pair of angularly arranged plates for the reception of the linked sausages, means for adjusting the position of said plates, and tension means located above said plates and adapted to bear against said sausages.

9. In a sausage stuffing and linking machine adapted to be connected to a stuffer containing sausage meat, a casing having a passage for the flow of meat, a plunger provided with a valve operable in said passage, and rings on said plunger for preventing leakage of the meat.

10. In a sausage stuffing and linking machine provided with a passage communicating with a stuffer containing sausage meat, operating means for stuffing and twisting a casing, means for controlling said passage, and means connected with said operating and control means for effecting a starting of said operating means ahead of said control means.

11. In a sausage stuffing and linking machine provided with a passage communicating with a stuffer containing sausage meat, operating means for stuffing and twisting a casing, starting means therefor, control means for said passage, and means associated with said starting and control means for operating the starting means ahead of the flow of sausage through said passage.

12. In a sausage stuffing and linking machine provided with a passage communicating with a stuffer containing sausage meat, operating means for stuffing and twisting a casing, control means for said passage, and means movable with said control means for starting said operating means ahead of the flow of sausage meat from said stuffer.

13. In a sausage stuffing and linking machine, means for stuffing a casing and provided with a passage, a valve mechanism for said passage, a cam operated lever for movement of said valve, and means for varying the fulcrum of said lever for varying the movement of said valve.

In witnes whereof, I hereunto subscribe my name to this specification.

ROY C. KNOLL.